(12) United States Patent
Couturet et al.

(10) Patent No.: US 7,258,042 B2
(45) Date of Patent: Aug. 21, 2007

(54) AUTOMATIC CYCLE PEDAL WITH MULTIPLE ENGAGEMENT SURFACES

(75) Inventors: Jean-Pierre Couturet, Nevers (FR); Frédéric Roudergues, Nevers (FR)

(73) Assignee: Look Cycle International, Nevers (FR)

( * ) Notice: Subject to any disclaimer, the term of this patent is extended or adjusted under 35 U.S.C. 154(b) by 171 days.

(21) Appl. No.: 10/973,284

(22) Filed: Oct. 27, 2004

(65) Prior Publication Data
US 2005/0087036 A1 Apr. 28, 2005

(30) Foreign Application Priority Data
Oct. 27, 2003 (FR) .................................. 03 12522

(51) Int. Cl.
*G05G 1/14* (2006.01)
*B62M 3/08* (2006.01)
(52) U.S. Cl. ..................................... 74/594.6; 74/594.4
(58) Field of Classification Search .............. 74/594.4, 74/594.6; 36/131; *B62M 3/08*
See application file for complete search history.

(56) References Cited

U.S. PATENT DOCUMENTS

| 5,417,128 | A |   | 5/1995 | Beyl |         |
|-----------|---|---|--------|------|---------|
| 6,085,614 | A | * | 7/2000 | Lin  | 74/594.6 |
| 6,205,885 | B1 |  | 3/2001 | Hermansen et al. | |
| 6,216,558 | B1 | * | 4/2001 | Marui | 74/594.6 |
| 6,341,540 | B2 | * | 1/2002 | Steinberg | 74/594.6 |
| 2004/0168542 | A1 | * | 9/2004 | Hermansen et al. | 74/594.4 |

FOREIGN PATENT DOCUMENTS

| FR | 2 822 433 |   | 9/2002 |
|----|-----------|---|--------|
| FR | 2822127   | * | 9/2002 |
| FR | 2 836 117 |   | 8/2003 |
| JP | 11-189190 | * | 7/1999 |

OTHER PUBLICATIONS

PTO 06-6595, Translation of French Patent No. 2 822 433 A1, Inventor Frank Savard, Sep. 2006, PTO STIC Library.*

* cited by examiner

*Primary Examiner*—Vinh T. Luong
(74) *Attorney, Agent, or Firm*—Young & Thompson (57) ABSTRACT

The pedal comprises a pedal body (2) mounted rotatably on a pedal axle (3) and provided with a retainer (7 to 10) of an engagement member fixed below a bicycle shoe, the retainer (7 to 10) comprising a first pair of arches (7, 8) mounted fixedly and a second pair of arches (9, 10) mounted pivoting between the fixed arches (7, 8). A resilient return (12, 13) acts on the pivoting arches (9, 10) to urge them toward a position of retaining the engagement member between a fixed arch (7, 8) and a pivoting arch (9, 10) following relative angular spacing apart of these latter by said engagement member against the action of the resilient return (12, 13). The pivotal axis of each pivoting arch (9, 10) is eccentric to the axis of rotation (A-A) of the pedal axle (3).

8 Claims, 13 Drawing Sheets

AUTOMATIC CYCLE PEDAL WITH MULTIPLE ENGAGEMENT SURFACES

BACKGROUND OF THE INVENTION

1. Field of the Invention

The present invention relates to an automatic cycle pedal with multiple engagement surfaces.

2. Description of the Related Art

The idea of "automatic" is connected to the fact that the shoe carries an engagement member or retaining wedge in the form of a plate fixed below the shoe sole and adapted to engage a hands-free securement by quite simply pressing this wedge against retaining means provided on the pedal. These latter are connected to a pedal body mounted rotatably on a pedal axle adapted to be connected to a pedal crank. They generally comprise a front fixed member for engagement with the wedge and a rear movable retaining member which can be resiliently swung between a position for releasing the wedge and a position for retaining this latter against an engagement surface on the body of the pedal.

Pedals of this type differ from each other essentially by the use of automatic retaining means used to connect the wedge to the pedal body.

There are known such pedals with double face engagement, in which the retaining means are duplicated on two diametrically opposed engagement surfaces on opposite sides of the pedal body.

There is also known from U.S. Pat. No. 6,205,885, an automatic pedal provided with quadruple engagement surfaces, which is to say four engagement surfaces at 90° to each other. The retaining means of a wedge fixed below the cyclist's shoe sole comprises, according to this patent, a pair of arches secured to the pedal body and mounted diametrically opposed on opposite sides of this latter, as well as a pair of arches mounted pivotally between the fixed arches, on opposite sides of the pedal body. The pivoting arches are connected rigidly to each other and are mounted rotatably about the pedal axle whilst being urged toward a retaining position for the wedge by resilient return means in the form of a helicoidal spring threaded over a sleeve on the pedal body extending about the axle of the pedal.

This pedal thus has four engagement surfaces for the wedge on the body of the pedal, each engagement surface being defined between a pivoting arch and a fixed arch. The wedge can thus be emplaced on such an engagement surface during an engagement phase by angularly separating a pivoting arch from an adjacent fixed arch located in front of or behind the pivoting arch. The wedge can then be freed from the engagement plane by a rotational movement of the shoe during a disengagement phase of the wedge. This technique is well known in this field and will not be described in greater detail.

However, the pedal according to U.S. Pat. No. 6,205,885 has a certain number of drawbacks, among them:

- the amplitude of relative angular movement of the fixed and pivoting arches is great during engagement and release of the wedge and corresponds to a value of about 30°, which renders the engagement and disengagement operations complicated;
- the pivoting arches are arranged so as to rotate about the pedal axle, they are rigidly connected to each other and have between them a bore; because the pivoting arches are disposed within the fixed arches of the pedal body, it is necessary to provide the sleeve mentioned above to support the bearings, which complicates the assembly;
- the helicoidal return spring also requires the passage of the pedal axle through its center, which further complicates the assembly;
- the relative position of the fixed and pivoting arches relies on the geometry and characteristics of the helicoidal return spring; and the manufacturing tolerances of this latter do not always permit ensuring a correct symmetrical spacing between the fixed and movable arches, which can alter the operation;
- because of the large number of rotatable members, the pedal body with its pair of fixed arches has shapes that are complicated and difficult to use, the more so as it is constituted of a very resistance material to withstand the repeated forces and wear, and it is for this reason difficult to machine.

SUMMARY OF THE INVENTION

The invention has for its object to overcome these drawbacks by providing an automatic pedal of this type which is simple to produce and to assemble, which permits a lesser angular movement of the pivotal arches relative to the fixed arches, with a relative angular movement of the arches that is very exact, and whose resilient return member is no longer hindered by a central sleeve.

The object of the invention is an automatic cycle pedal with multiple engagement surfaces, comprising a pedal body mounted rotatably on a pedal axle adapted to be connected to a pedal crank, said pedal body being provided with means for retaining an engagement member fixed below a bicycle shoe, said retaining means comprising a first pair of arches mounted fixedly on said pedal body extending radially on opposite sides of said pedal body, and a second pair of arches mounted pivotally on opposite sides of said pedal body between said fixed arches, resilient return means acting on the pivoting arches so as to urge them toward a retaining position of said engagement member against the pedal body between a fixed arch and a pivoting arch following a relative angular spacing apart of these latter by means of said engagement member against the action of said resilient return means, characterized by the fact that the pivotal axle of each pivoting arch is eccentric relative to the axis of rotation of said pedal axle.

According to other characteristics of the invention:

- the pivoting arches are adapted to pivot independently of each other about a separate pivotal axle;
- each pivoting arch has an actuating handler acting on said resilient return means so as to permit said angular relative spacing apart of one pivoting arch relative to a fixed arch to emplace said engagement member between these latter;
- said resilient return means comprises a resilient split ring extending about said pedal axle and bearing on said actuating member so as to coact directly with this latter;
- said actuating member has the shape of a first hollow cylindrical section connected at one of the ends of each pivoting arch and extending axially within the arch while presenting on its external surface a bearing surface against which said resilient ring rests;
- said bearing surface comprises an axial rib received in the slot of said ring so as to limit the rotation of this latter;
- each pivoting arch comprises at its other end a second hollow cylindrical section extending within the arch and having on its external surface a bearing surface against which rests a second split resilient ring;

the first and second cylindrical sections of each pivoting arch rest on a respective tubular element secured to the pedal body while extending coaxially to the pedal axle between the fixed arches;

said tubular elements comprise on their external surfaces recesses forming seats receiving said first and second cylinder sections;

each end of said seats defines a pivotal axis of said cylinder sections permitting the corresponding pivoting arch to pivot in one direction or the other by acting on the resilient ring or rings;

the pedal comprises means for limiting the amplitude of pivoting movement of the pivoting arches;

said amplitude limiting means comprise for each pivoting arch a pair of abutments disposed on the pedal body on opposite sides of said actuating member;

said amplitude limiting means comprise a sleeve for limiting amplitude, threaded on the pedal body and comprising notches receiving the arches, the sleeve permitting defining said amplitude of pivoting;

the width of the notches receiving the fixed arches is such relative to the width of the latter that the sleeve is blocked in rotation;

an amplitude limiting sleeve is disposed on each external side of the arches;

a sealing ring is disposed in an interstice between said tubular elements of the pedal body;

said sealing ring is on its lateral surfaces provided with lugs for blocking in rotation, which project into said seats on the tubular elements;

the pedal comprises a support tube disposed in the pedal body coaxially with this latter and secured in rotation with this latter, the support tube comprising on its external surface longitudinal grooves extending parallel to the pedal axle and forming seats receiving the pivoting arches;

the ends of each pivoting arch have an L shape of which one of the branches, called the axial branch, is disposed in the corresponding seat (29) so as to define the pivotal axis (P-P, P'-P') of the arch;

the pedal body comprises a front sleeve connected to a rear sleeve by the fixed arches, and the front and rear sleeves are disposed so as to extend about the axial branches of the pivoting arches to hold the ends of these latter in the seats in the support tube.

the actuating member has the shape of a blade 11" extending in the plane of the arch 9, 10 in front of the support tube 28 in a seat 31 delimited by the front sleeve 2';

said resilient return means for the pivoting arches 9, 10 comprises two helicoidal springs 31 disposed transversely on opposite sides of said actuating members 11" and bearing on the one hand against these latter and on the other hand against the internal surface of the pedal body;

said resilient return means for the pivoting arches 9, 10 comprises two leaf springs disposed transversely on opposite sides of said actuating members, the ends of each spring being bent toward the center so as to constitute the leaf spring properly so called in contact with the actuating members 11";

said resilient return means of the pivoting arches 9, 10 comprises a dog clutch device 34 comprising a first disc with lugs 35 mounted rotatably and actuated in its rotation by said actuating member, said first disc with lugs coacting with a second disc with lugs 36 mounted blocked in rotation and axially movable whilst being urged by a spring 37 toward said first disc with lugs (36);

said resilient return means for the pivoting arches 9, 10 comprises a cam device 41 comprising a cam disc 42 blocked in rotation whilst being axially movable by said actuating member against the force of the action of a return spring 37;

said resilient return means for the pivoting arches 9, 10 comprises a resilient return cylindrical block, said resilient return block comprising on its periphery two diametrically opposed holes each receiving one of the ends of each pivoting arch;

the pivotal axes P-P, P'-P' of the pivoting arches 9, 10 form with the axis of rotation A-A of the pedal axle 3 an angle a approaching the pedal axle in the direction of the external end of this latter, the portion of the arch 9, 10 which is the farthest from the pivotal axis remaining parallel to the axis of rotation A-A of the pedal axle.

Other characteristics and advantages of the invention will become apparent from the description which follows, of several embodiments of the invention that are not limiting, with reference to the accompanying drawings, in which:

DESCRIPTION OF THE PREFERRED EMBODIMENTS

In the drawings, identical or equivalent elements bear the same reference numerals.

FIGS. 1 to 11 show a first embodiment according to the invention of the automatic pedal 1 with four bearing surfaces. The pedal comprises a pedal body 2 mounted rotatably on a pedal axle 3 of which one of the ends is provided with a screw thread 4 permitting its connection to a pedal crank (not shown).

Figure 1:
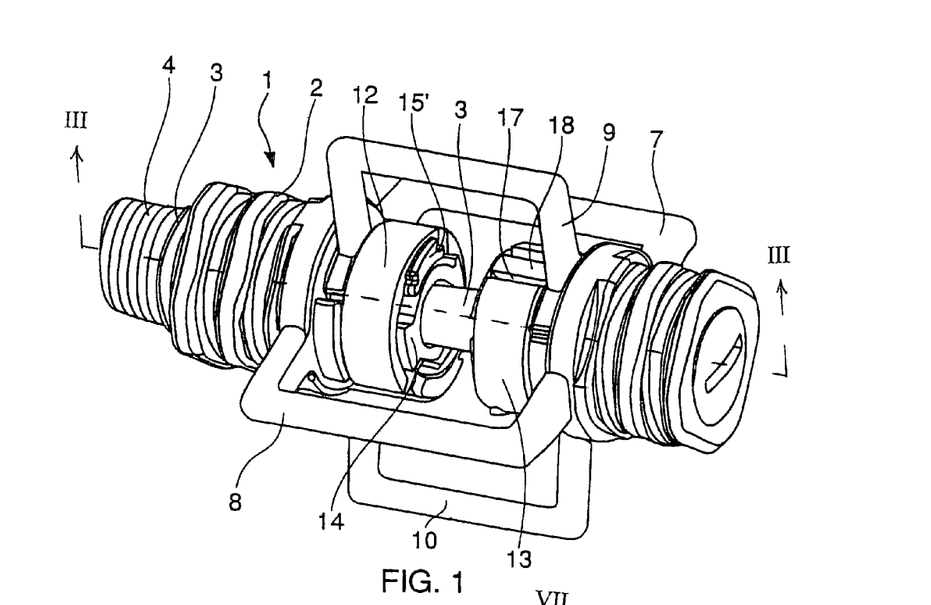
FIG. 1 is a perspective view of a pedal according to a first embodiment of the invention, comprising rings forming resilient return means.
Figure 2:
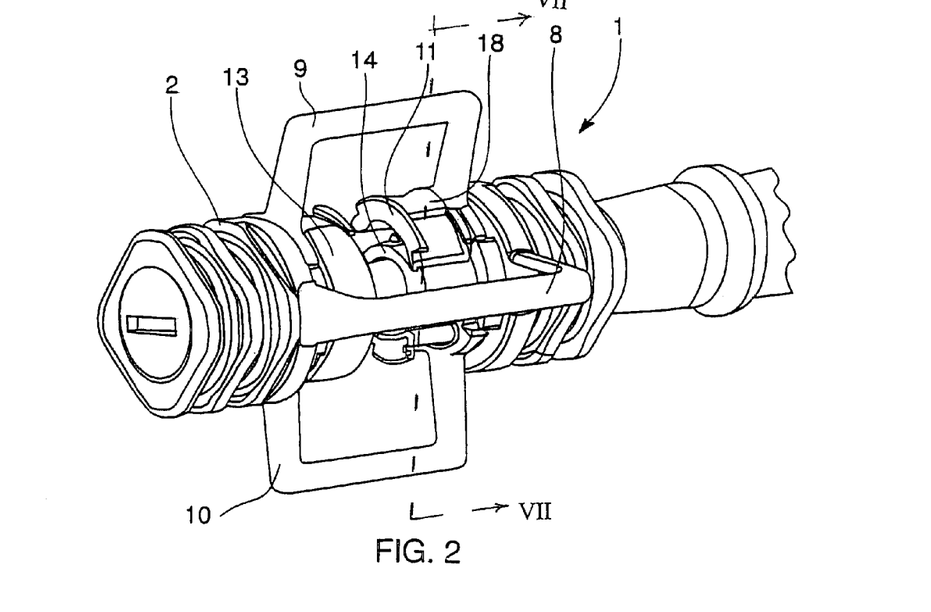
FIG. 2 is a perspective view of the pedal of FIG. 1, without one of the resilient rings and showing one of the movable arches inclined toward the rear.
Figure 3:
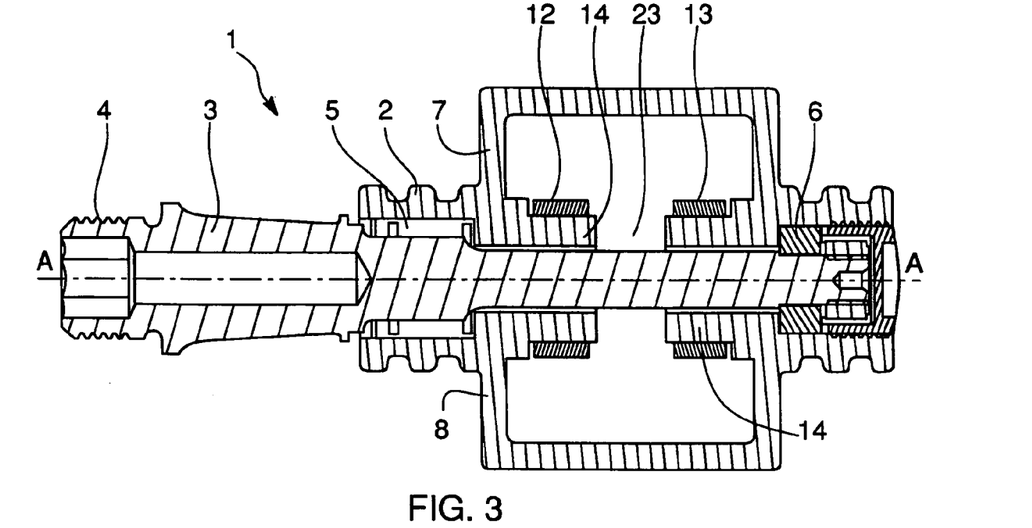
FIG. 3 is a longitudinal cross-sectional view of the pedal of FIG. 1, on a plane which passes through the fixed arches as identified on FIG. 1.

The pedal body 2 is mounted rotatably on the pedal axle 3 by roller bearings 5 and 6. The pedal body is provided with means for returning an engagement member in the form of a plate or a blade (not shown) fixed below a bicycle shoe (not shown) so as to permit rapid and automatic securement of the shoe against the pedal 1.

The returning means comprise a first pair of fixed arches 7, 8 secured to the pedal body 2 so as to turn with the latter about the pedal axle 3. The fixed arches 7, 8 are disposed diametrically opposite each other so as to extend radially on opposite sides of the pedal body 2.

The returning means also comprise a second pair of arches 9, 10 mounted pivotally on opposite sides of the pedal body 2 between the fixed arches 7, 8. According to one characteristic of the invention, the pivotal axis of each pivoting arc is eccentric to the axis of rotation A-A of the pedal axle 3. This characteristic will be described in greater detail in what follows of the description of the different embodiments of the invention.

A bearing surface is defined between each fixed arc and an adjacent arc, forward or rearward, such that four bearing surfaces of the engagement member will be obtained at an angular distance of 90° from one bearing surface to the next.

A resilient return means or member acts on the pivoting arches 9, 10 so as to urge them toward a position for returning the engagement member against the pedal body 2 between a fixed arch 7, 8 and a pivoting arch 9, 10 following a relative angular spacing apart of these latter by means of the engagement member under the action of the resilient return means.

This moreover constitutes the principle of operation of any automatic pedal, and it suffices to present the engagement member between two arches, to engage below the forward arch, and to press downwardly against the rear arch to obtain this angular spacing apart of the arches.

Thanks to the action of the resilient return means, the arches close about the engagement member to retain the latter. So as thereafter to free the engagement member, it suffices to carry out a slight rotation of the foot about a pivot point in front so as again to space apart the arches so as to withdraw the shoe from the pedal.

According to the invention, each pivoting arch 9, 10 carries an actuating member 11 acting on the resilient return means so as to permit the relative angular spacing apart between the pivoting arch in question and the fixed arches 7, 8 for the emplacement of the engagement member between these latter.

In the first embodiment, the resilient return means comprises at least one resilient split ring 12 extending about the pedal axle 2. Preferably, the resilient return means comprises a second resilient split ring 13 identical to the first.

Figure 6:
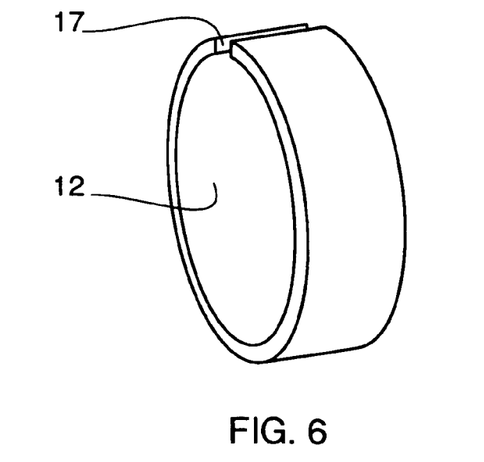
FIG. 6 is a perspective view of a resilient split ring.

The resilient split rings 12, 13 are preferably of a metallic alloy which provides the necessary elasticity.

These rings 12, 13 are disposed within fixed and pivotal arches 7 to 10 and bear against the actuating members 11 so as to coact directly with these latter. They rest moreover on a respective tubular element 14 secured to the pedal body 2 and extending coaxially to the axis of pedal 3 between the fixed arches 7, 8. The respective slot of each ring 12, 13 is directed in an opposite direction relative to the slot of the other ring.

The actuating member 11 has, according to this embodiment, the shape of a first section of hollow cylinder connected to one of the ends of each pivoting arch 9, 10 and extending axially within the arch while having on its external surface a support surface 15 against which rests the resilient split ring 12.

Figure 5:
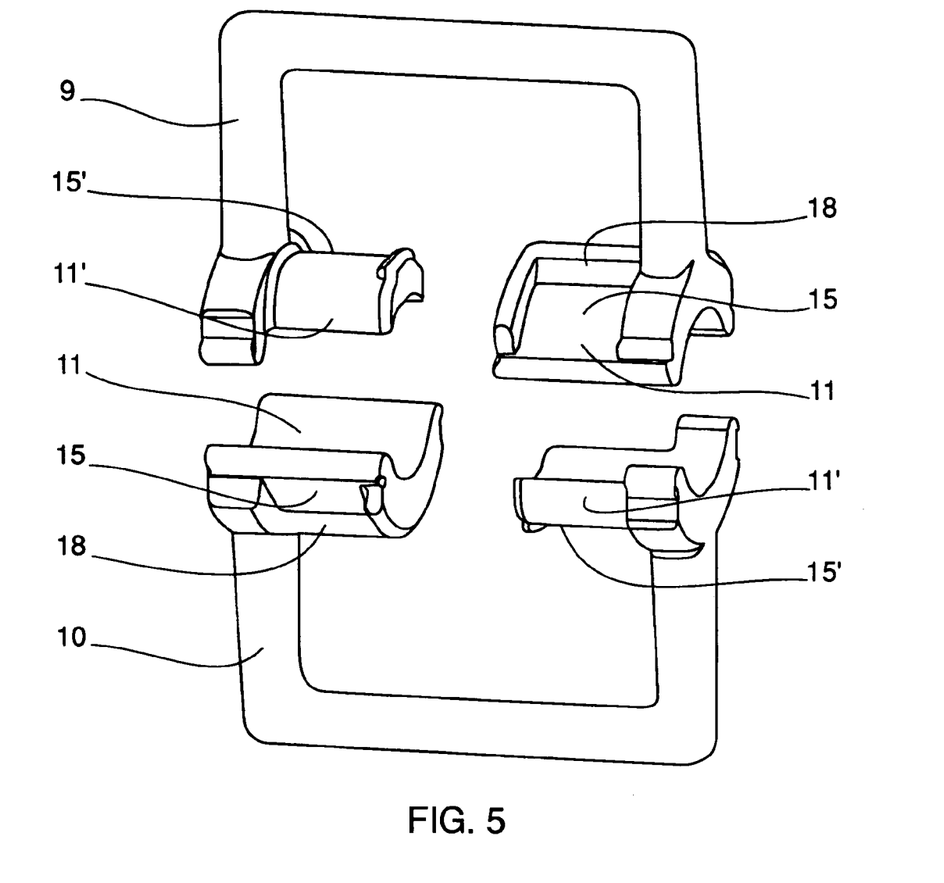
FIG. 5 is a perspective view of the movable arches.

In the example shown with two rings 12, 13, each pivoting arch 9, 10 comprises at its other end a second hollow cylindrical section 11' extending within the arch and also having on its external surface a bearing surface 15' against which rests the second resilient split ring 13.

The tubular elements 14 comprise recesses 16 diametrically opposed forming seats (see FIGS. 4 and 7) receiving the first and second cylinder sections 15, 15'.

Figure 4:
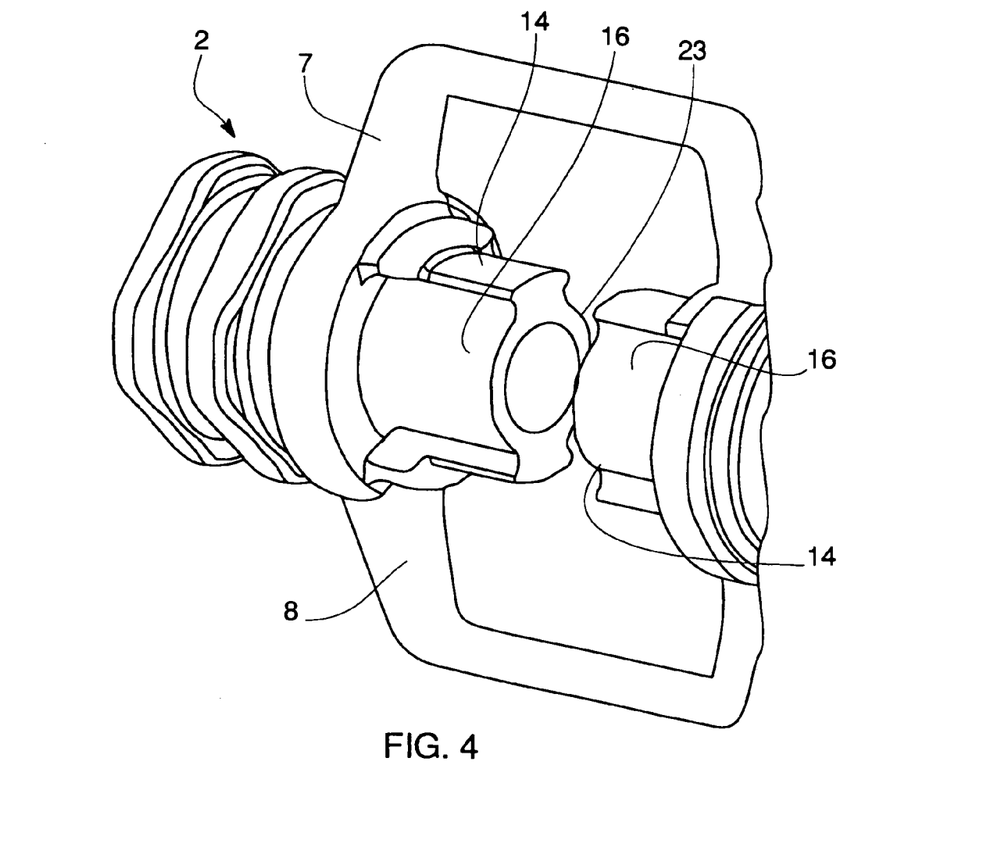
FIG. 4 is a perspective view of the body of the pedal with the fixed arches.

In the illustrated example, the recesses 16 have a cylindrical surface coacting with the lower surface of the sections of cylinder, which are also cylindrical.

Figure 7:
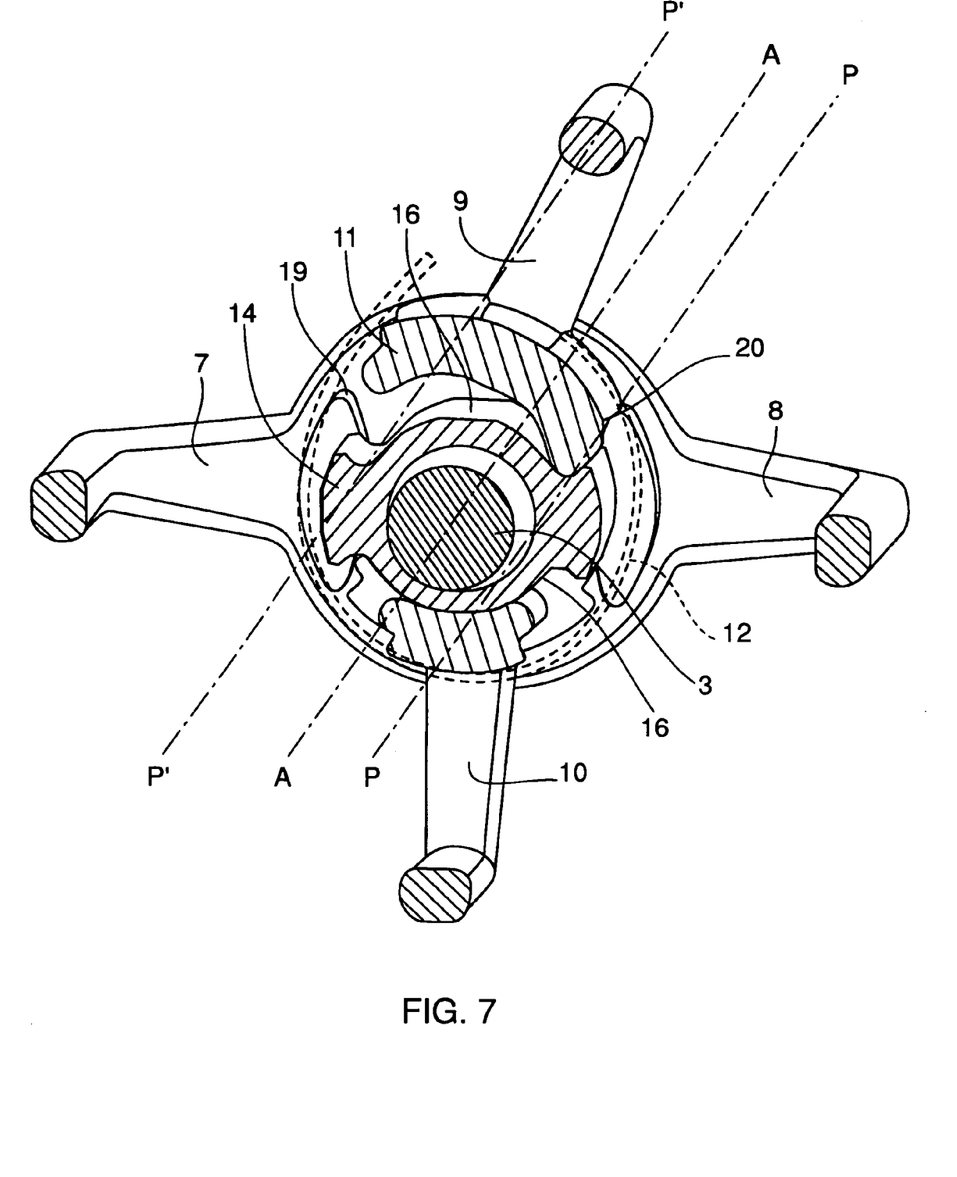
FIG. 7 is a schematic transverse cross-sectional view of the pedal without resilient rings, showing one of the arches in a maximum swung position and bearing against an abutment, taken along the plane indicated in FIG. 2.

The opposite ends of each seat 16 define a pivotal axis respectively P-P, P'-P' of the cylinder sections 11, 11' permitting the corresponding pivoting arch 9, 10 to pivot in one direction or the other against the force of resilient spring rings 12, 13.

Moreover, a second section of cylinder 11' can have a reduced width (see FIGS. 5 and 7) relative to that of the first cylinder section 11, so as to decrease the force on the side opposite the slot 17 of the second ring 13.

The bearing surface 15 for the first section of hollow cylinder 11 comprises preferably an axial rib 18 extending in the slot 17 of the ring 12 so as to limit the rotation of this latter such that the slot will always be directed in the same direction in the absence of actuation of the corresponding pivoting arch 9, 10.

The operation of the device according to this first embodiment of the invention is shown in FIG. 7, in which the ring is represented in broken lines for greater clarity. This figure shows at the end of the engagement phase of an engagement member (not shown), that it is desired to place between the fixed arch 7 and the pivoting arch 9. The pivoting arch 10 is located in this instance in its initial position in which it is non-stressed, or the retaining position, whilst the pivoting arch 9 is urged to obtain an angular spacing of this arch relative to the fixed arch 7.

This urging is obtained by the engagement member which exerts a force directed toward the center of the pedal, which gives rise to the pivoting of the pivoting arch 9 about the pivotal axis P-P which is eccentric relative to the rotation axis A-A of the pedal axle 3. The upper surface of the hollow cylinder section 11 forming an actuating member thus forces the split ring 12 to open whilst remaining in contact with the ends of the ring. Once the engagement member is disposed in its engagement position against the pedal, the pivoting arch will automatically return under the action of the spring force of the rings 12, 13 to its initial position to retain the engagement member. The release of the engagement member is obtained by the rotation of the shoe, which gives rise to the relative angular spacing apart of the fixed arch 7 relative to the pivoting arch 9.

As will be clear, the two rings 12, 13 are simultaneously urged during pivoting of the pivoting arch 9 and the two contribute to returning this arch to its initial position.

If the engagement member were to be placed between the fixed arch 8 and the pivoting arch 9, the procedure would be strictly the same, but the pivoting arch would swing in this case in the other direction, about the pivotal axis P'-P'. What has been said is equally applicable for combinations of the pivoting arch 10 with the fixed arch 8, respectively the fixed arch 7.

So as to prevent the rings 12, 13 from losing contact with the bearing surfaces 15 on the hollow cylinder sections 11, the pedal 1 moreover comprises means for limiting the amplitude of pivoting of the pivoting arches 9, 10.

In the illustrated example, these means for limiting the amplitude of pivoting comprise for each pivoting arch 9, 10 a pair of abutments 19, 20 disposed on the pedal body 2 so as to extend on opposite sides of each hollow cylindrical section 11 (see FIG. 7).

Figure 8:
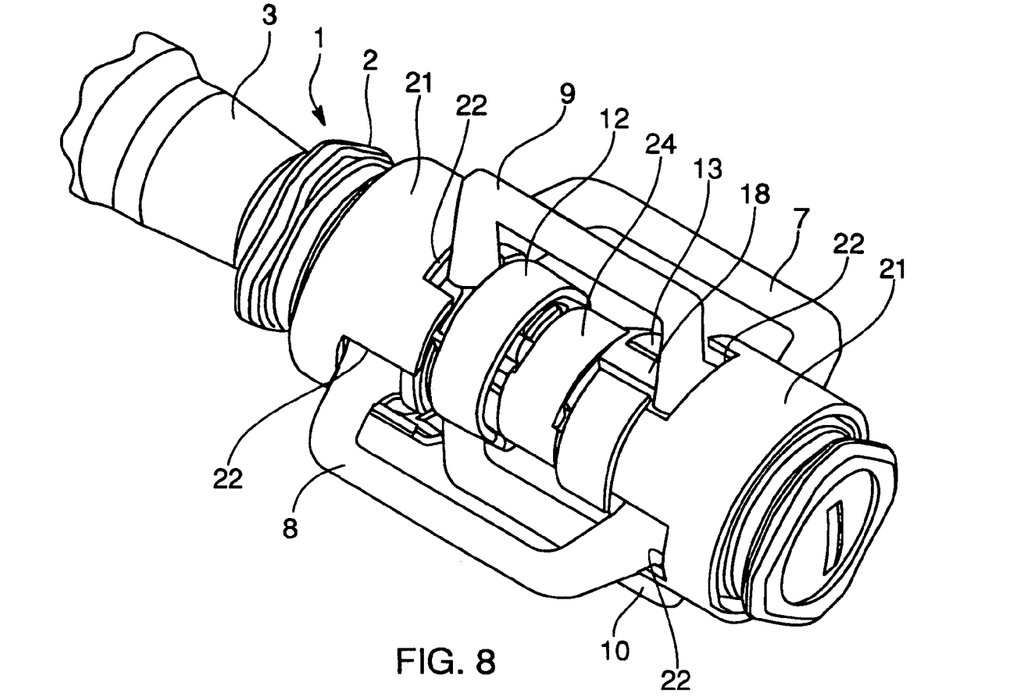
FIG. 8 is a perspective view of the pedal of FIG. 1 provided with a central sealing ring and two sleeves for limiting the amplitude of the movable arches.
Figure 9:
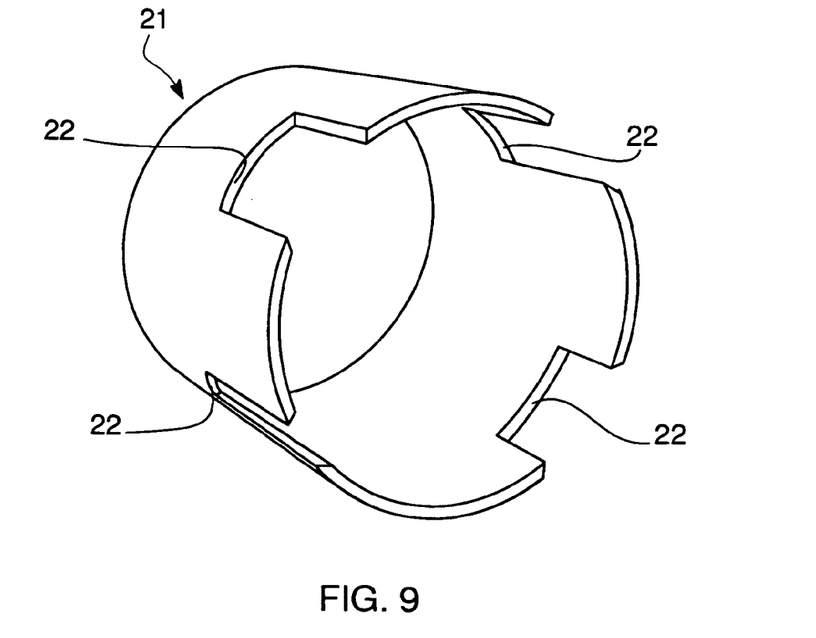
FIG. 9 is an end view of an amplitude limitation sleeve.
Figure 10:
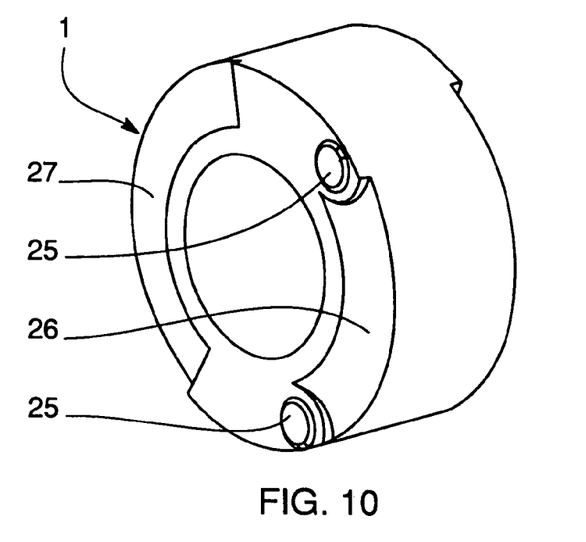
FIG. 10 is a perspective view of the central sealing ring.
Figure 11:
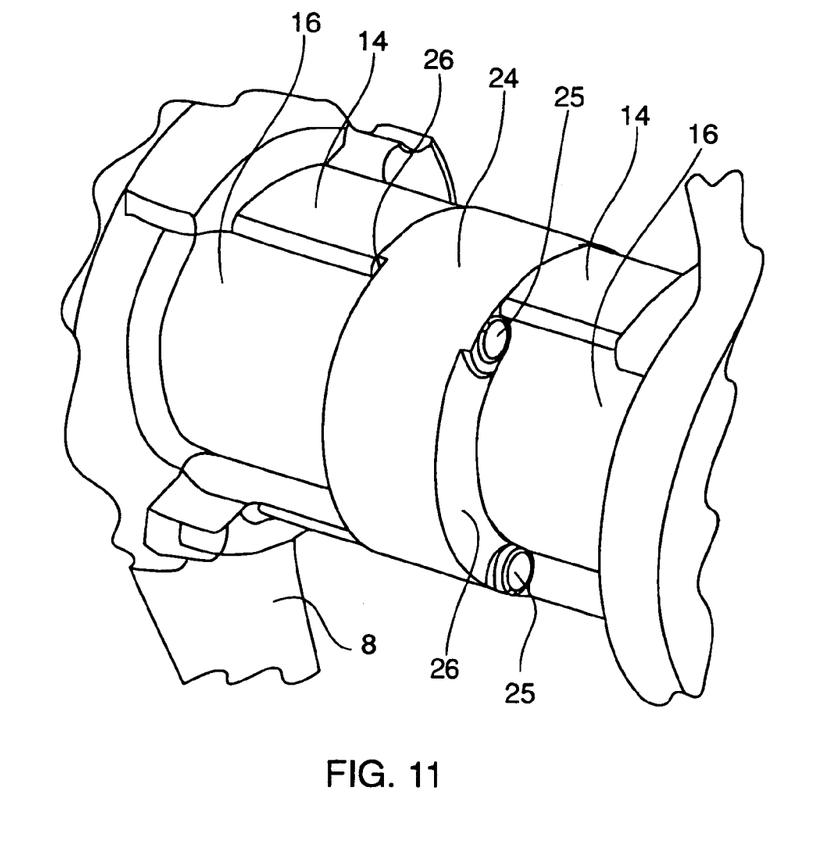
FIG. 11 is a perspective view of the central sealing ring mounted in the body of the pedal.

The means for limiting the amplitude of pivoting can also comprise, as a supplement to the abutments 19, 20 or as a modification in the absence of these latter, an amplitude limiting sleeve 21 threaded over the pedal body 2 and comprising notches 22 receiving the arches 7 to 10, the sleeve 21 permitting defining the amplitude of pivoting by adapting the width of the notches to the width of the pivoting arches 9, 10 whilst immobilizing the sleeve 21 on the pedal body 2.

Preferably, the width of the notches 22 receiving the fixed arches 7, 8 is such, relative to the width of these latter, that the sleeve 21 is blocked in rotation, whilst the width of the notches receiving the pivoting arches 9, 10 should not necessarily delimit the pivoting because this pivoting movement is in any event prevented when the upper surface of the cylinder section comes into abutment against the internal surface of the sleeve during this pivoting.

In all cases, the pivoting angle of the pivoting arches 9, 10 is extremely exact in both directions and does not change with time.

Preferably, such an amplitude limiting sleeve 21 is disposed on each side of the outside of the arches.

The tubular elements 14 delimit between them an interstice 23 (see FIGS. 3, 4) which is preferably closed by a sealing ring 24 of elastomer. This ring 24 is provided with lateral holding lugs 25 relative to the tubular elements 14 of the pedal body 2. These lugs 25 are disposed so as to extend into the recesses 13 of the tubular elements to block therein the rotation of the ring. The ring 24 moreover comprises on its external surfaces lateral recesses 26, 27 between two successive lugs 25 (see FIG. 10). These recesses are disposed facing the pivoting arches 9, 10 and create free spaces to avoid friction of the pivoting arches 9, 10 during their pivoting.

FIGS. 12 to 17 show a second embodiment of the automatic pedal according to the invention. The elements analogous to those already described with reference to the first embodiment carry the same reference numerals and will not be described in detail. Thus, the essential difference relative to the first embodiment relates to the use of the resilient return means and the manner in which the latter act on the pivoting arches.

Figure 12:
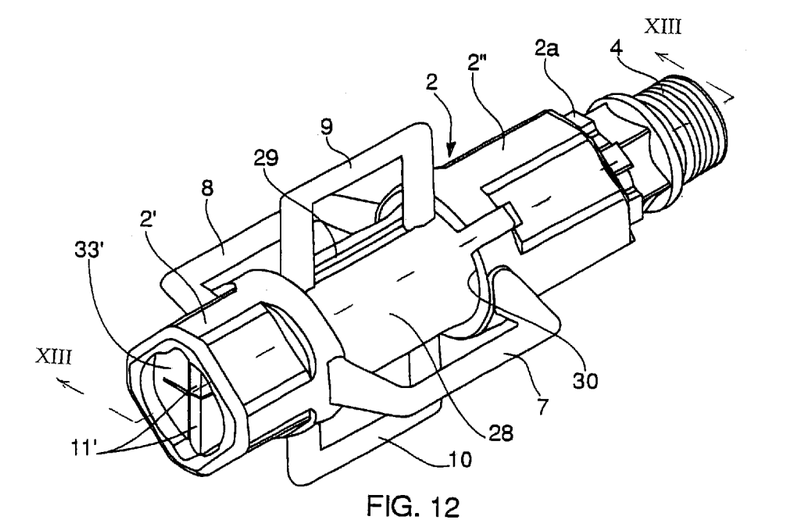
FIG. 12 is a perspective view of a pedal according to a second embodiment, comprising a support tube receiving on its periphery the movable arches, the pedal being shown broken away at its free end to render visible a seat receiving a return device coacting with one of the ends of each movable arch.
Figure 13:
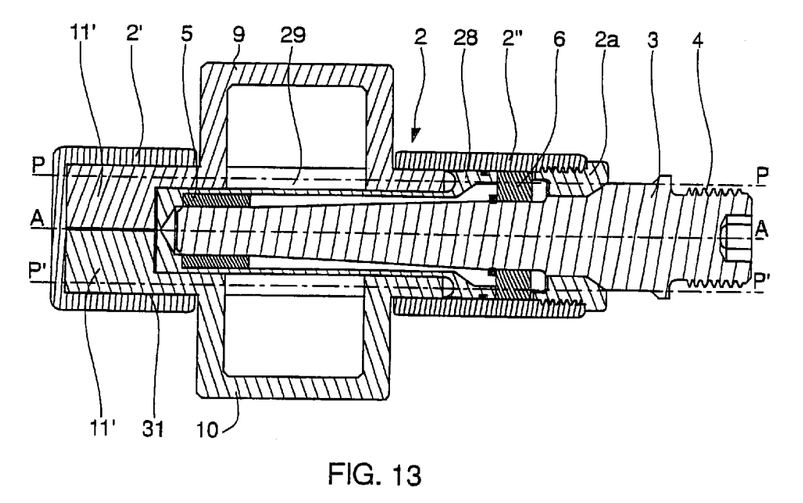
FIG. 13 is a cross-sectional view of the pedal of FIG. 12, taken along a plane indicated in FIG. 12.
Figure 14:
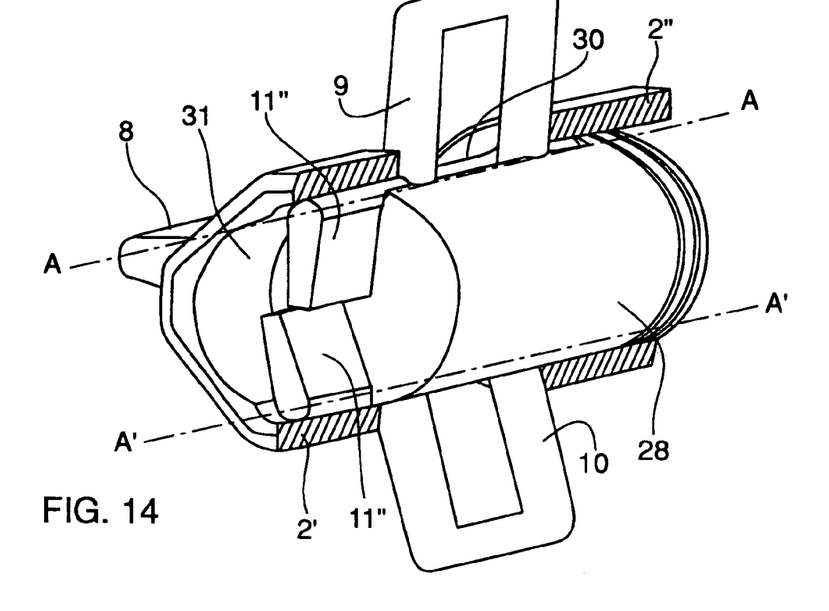
FIG. 14 is a perspective view showing the swinging of one of the movable arches on the support tube.

In this second embodiment, the pedal 1 comprises a support tube 28 disposed in the body coaxially to the latter and secured in rotation with this latter. In the illustrated example, the support tube 28 is closed at its forward end by a transverse wall. The support tube 28 receives the pedal axle 3 and carries on its internal surface roller bearings 5, 6. It comprises on its external surface longitudinal grooves 29 extending parallel to the pedal axle 3 and forming seats for the pivoting arches 9, 10. The ends of each pivoting arch have an L shape of which one of the branches, called the axial branch, is disposed in the corresponding seat 29 so as to define the pivotal axis P-P, P'-P' of the arch which is thus eccentric relative to the axis of rotation A-A of the pedal axle 3.

The pedal body 2 is, in this embodiment, comprised of a front socket 2' closed at its outer end and a rear socket 2", these two front and rear sockets 2', 2" being concentric and connected to each other by the fixed arches 7, 8 (see FIG. 12). The sockets 2', 2" are disposed so as to extend about the axial branches of the pivoting arches 9, 10 to hold the ends of these latter in the seats 29 in the support tube 28. They define between them a free space 30 through which the pivoting arches 9, 10 project, surrounded by the fixed arches 7, 8 and extending perpendicular to the idle position.

One of the ends of L shape of the pivoting arches 9, 10 carries an actuating member acting on a resilient return means for the corresponding pivoting arch. In this embodiment, the actuating member has the shape of a blade 11" extending in the plane of the arch 9, 10 and outside the support tube 28 in a seat 31 delimited by the front socket 2' before the front end surface of the support tube 28. This blade 11" is normally, which is to say in the idle position of the pivoting arch, directed toward the axis of rotation of the pedal axle 3 (see FIGS. 12 and 13).

Figure 15:
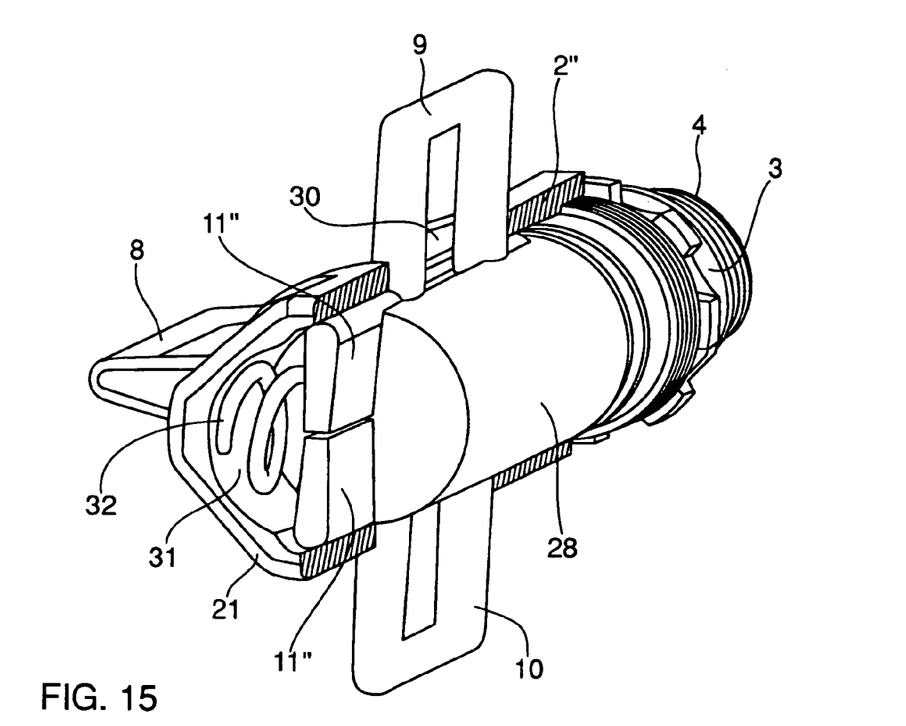
FIG. 15 is a perspective view of the pedal of FIGS. 12 to 14, provided with a return device in the form of transversely extending helicoidal springs.

The resilient return means of the pivoting arches 9, 10 comprises according to the modification shown in FIG. 15 two helicoidal springs 31 of which only one is shown. These helicoidal springs are disposed transversely in the seat 31 on opposite sides of the blades 11" and bear on the one hand against these latter and on the other hand on the internal surface of the socket 2'.

The pedal axle 3 is axially fixed with the help of a screw nut 2a on the inside and whose external screw thread coacts with a tapping provided in the rear socket 2".

Figures 16, 17:
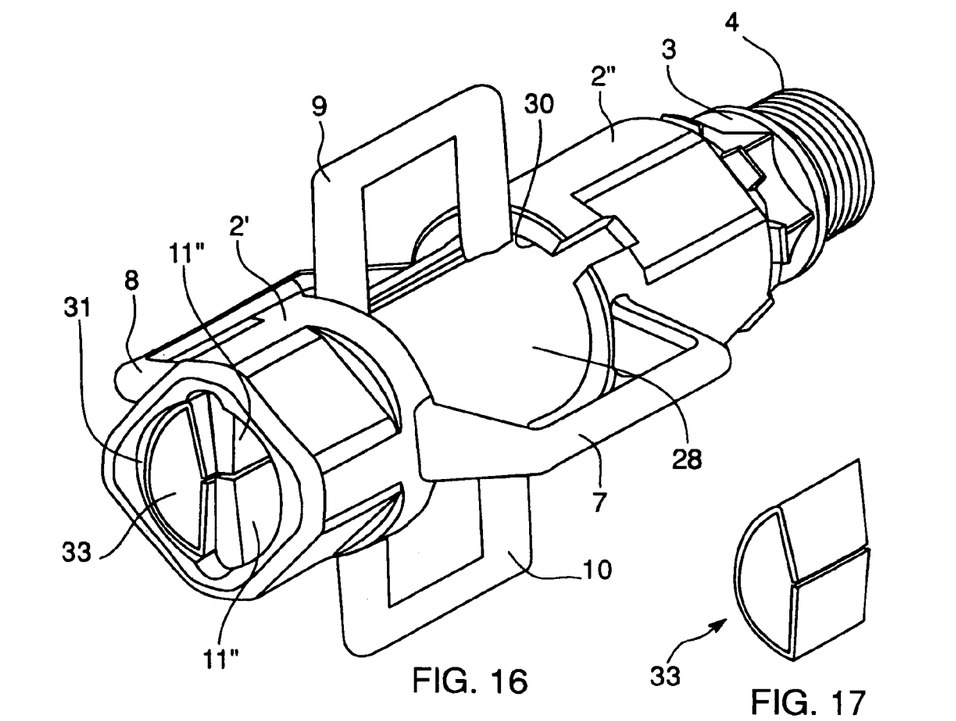
FIG. 16 is a perspective view of the pedal of FIGS. 12 to 14 provided with a return device in the form of a leaf spring.
FIG. 17 is a perspective view of a leaf spring of the return device of FIG. 16.
Figure 18:
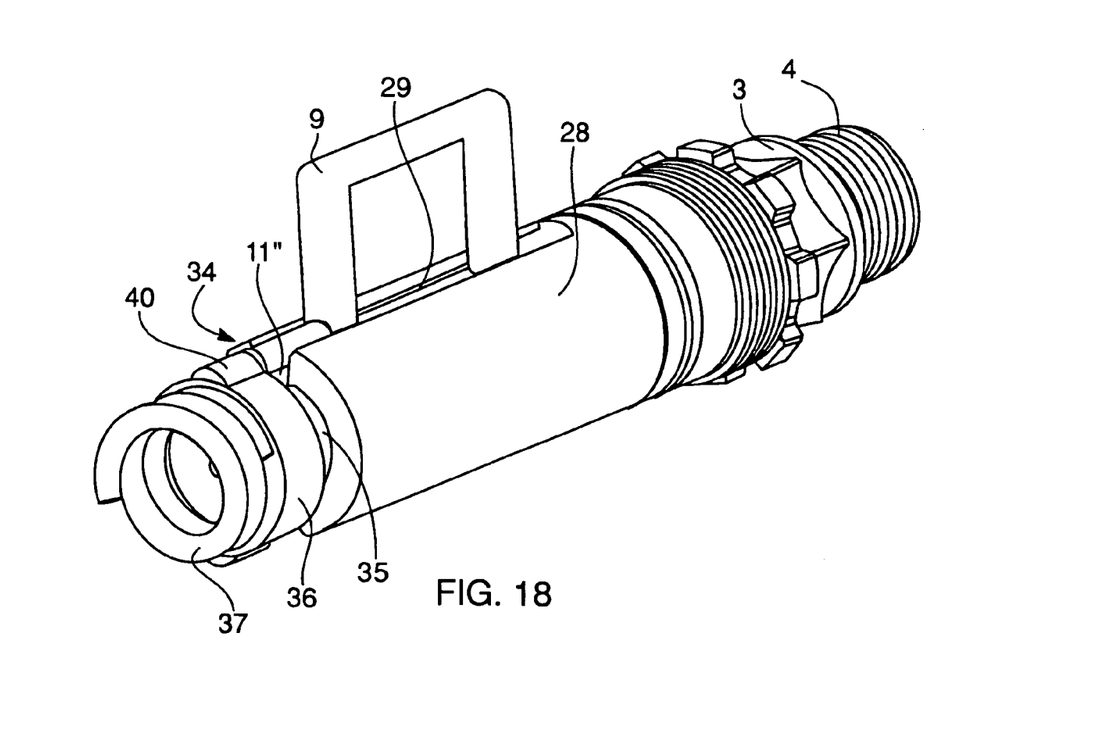
FIG. 18 is a schematic perspective view of a detail of the pedal of FIGS. 12 to 14 provided with a return device in the form of dog clutch means associated with a helicoidal spring.
Figure 19:
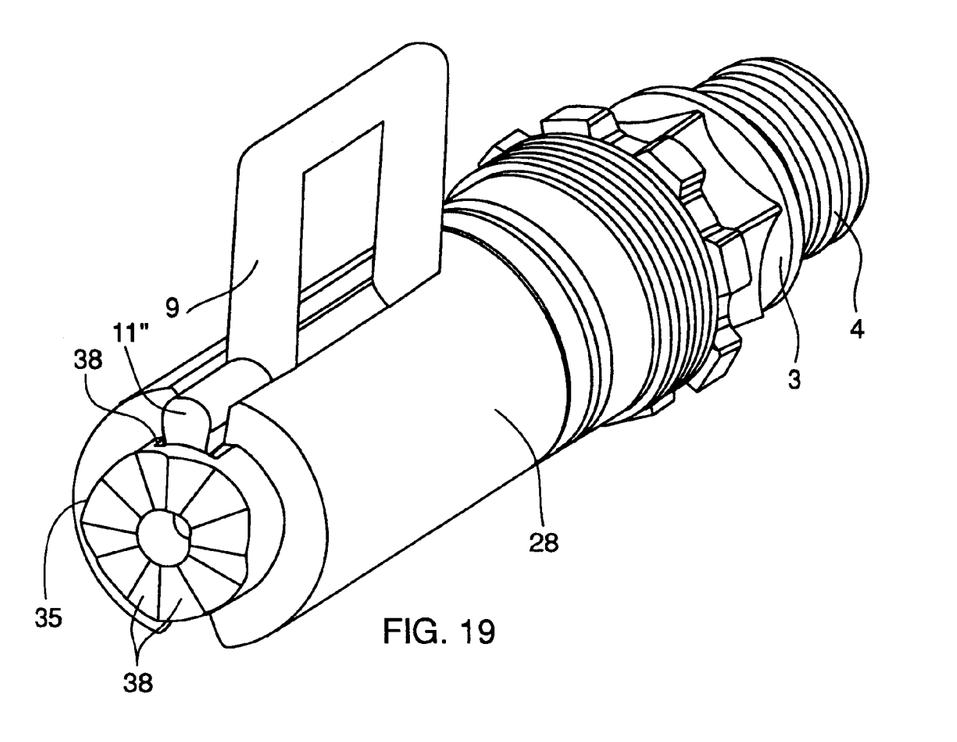
FIG. 19 is a view corresponding to FIG. 18 after removal of the helicoidal spring and of one of the dog clutch means.

FIG. 16 shows a second embodiment of resilient returns means for the pivoting arches 9, 10, which comprises two leaf springs 33 of which only one is shown in this figure, as well as separately in FIG. 17. Each leaf spring comprises a portion adapted to the shape of the internal surface of the seat 31, whilst its ends are bent toward the center so as to constitute the leaf spring properly so called in contact with the blades 11" of the pivoting arches 9, 10.

FIG. 18 to 21 show a third embodiment of resilient return means for the pivoting arches 9, 10, which comprises a dog clutch device 34 comprising a first disc with lugs 35 coacting with the second disc with lugs 36 urged by a helicoidal spring 37 disposed concentrically to the axis of rotation A-A of the pedal body 2 and bearing on the one hand against the second disc with dog teeth 36 and on the other hand against the transverse wall of the front socket 2' of the pedal body 2. The entire assembly is disposed in the seat 31 mentioned above.

Figure 20:
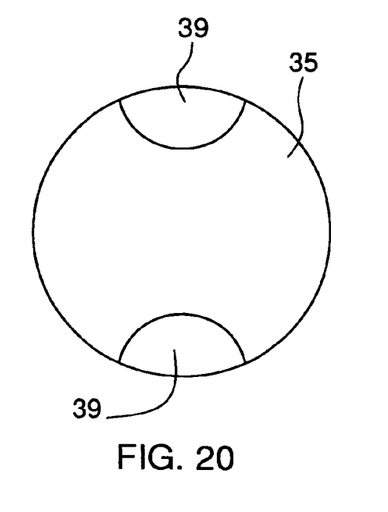
FIG. 20 is an end view of the external dog clutch means showing the notches receiving one of the ends of the movable arches.

The first disc with lugs 35 is mounted rotatably in the seat 31 and comprises on one of its surfaces lugs 38 and on its upper surface notches in the arc of a circle 39 receiving the blades 11" of the pivoting arches 9, 10.

Figure 21:
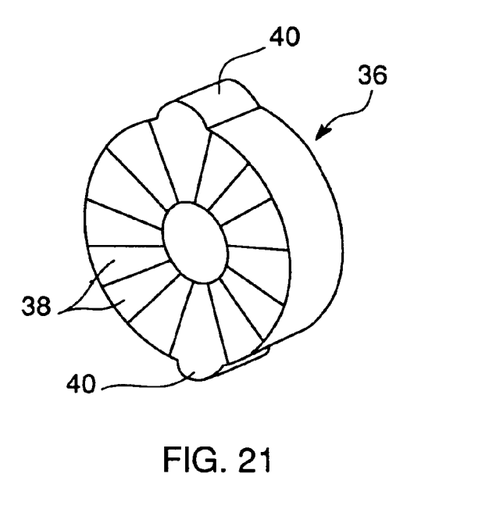
FIG. 21 is an end view of the external dog clutch means showing the clutching and two diametrically opposite ribs on the periphery of the means.

The second dog clutch disc 36 is provided on its periphery with two rounded axial ribs 40 diametrically opposed to each other and entering into axial grooves (not shown) provided on the internal surface of the front sleeve 2' of the pedal body so as to block the second disc 36 in rotation whilst permitting the axial movement of this latter under the effect of the action of the helicoidal return spring 37.

Figure 22:
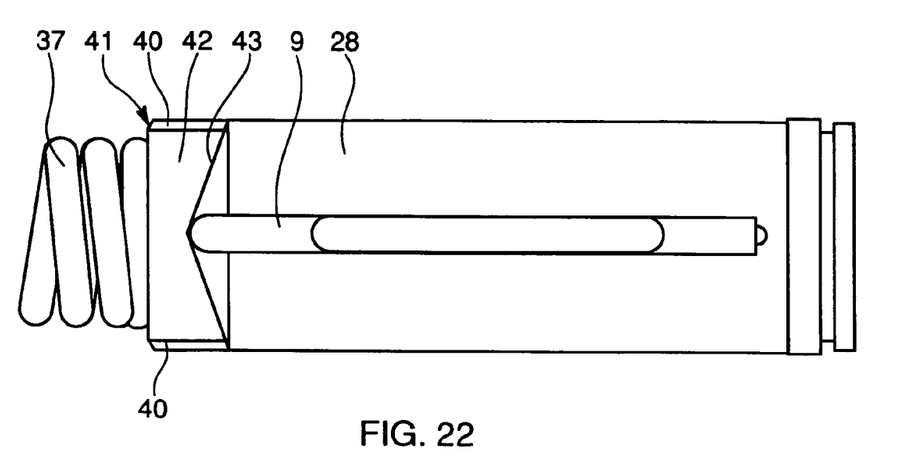
FIG. 22 is a schematic perspective view of a detail of a modification of the pedal of FIGS. 12 to 19, provided with a return device in the form of a cam associated with a helicoidal spring.
Figure 23:
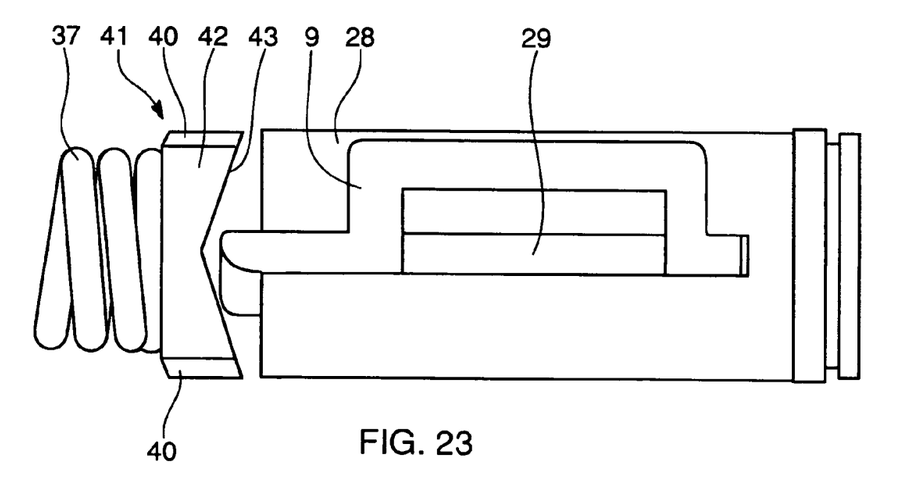
FIG. 23 is a schematic view corresponding to FIG. 22, after actuation of a movable arch.

FIGS. 22 and 23 show very schematically a third embodiment of the resilient return means of the pivoting arches 9, 10, which comprises a cam device 41. This latter comprises a cam disc 42 comprising on one of its surfaces, seen from the side, a V shaped recess 43 whose surfaces constitute cams coacting with the blades 11" of the pivoting arches 9, 10. The disc cam is on its periphery provided with two diametrically opposed rounded axial ribs 40, entering into axial grooves (not shown) provided on the internal surface of the front sleeve 2' of the pedal body so as to block the cam disc 42 in rotation whilst permitting the axial movement of this latter against the force of the action of the helicoidal return spring 37.

The opposite surface of the cam disc 42 constitutes a bearing surface for a helicoidal spring 37 analogous to the spring mentioned with reference to the preceding embodiment. The assembled pedal will have an appearance analogous to the pedal shown in FIG. 12.

Figures 24, 25:
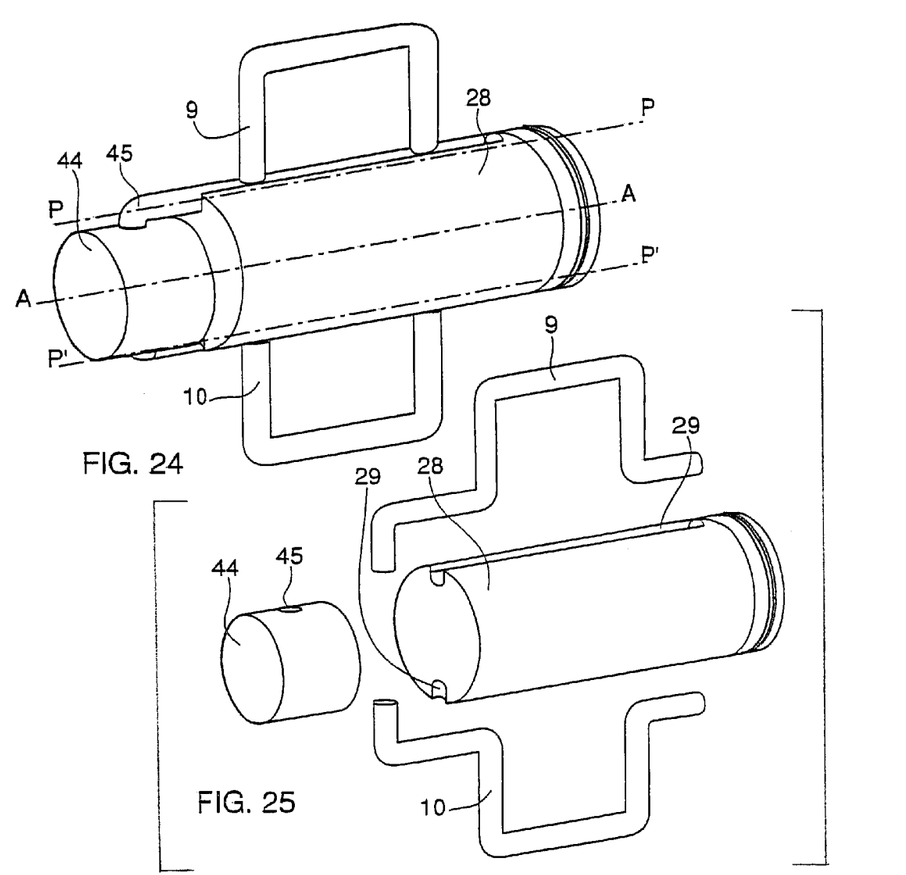
FIG. 24 is a schematic perspective view of a detail of another modification of the pedal of FIGS. 12 to 19, provided with a return device in the form of a cylindrical resilient return block.
FIG. 25 is an exploded view of the elements of FIG. 24.

FIGS. 24 and 25 show very schematically a fourth embodiment of the resilient return means for the pivotal arches 9, 10, which comprises a resilient cylindrical return block, preferably of an elastomer.

One of the ends of the pivoting arches 9, 10 has as before an L shape, whilst their other end has a Z shape to penetrate the diametrically opposite holes 45 provided in the periphery of the resilient block.

The block is quite like the helicoidal spring of the. two preceding embodiments disposed in the recess 31 mentioned above. The assembled pedal will have an appearance analogous to the pedal shown in FIG. 12.

FIG. 12 shows moreover very schematically a kinematic variant of the resilient return means of the pivoting arches 9, 10 which comprises two resilient split semi-cylindrical blocks 33', preferably of elastomer, and of which one is shown in this figure. These blocks 33' disposed transversely on opposite sides of said actuating member 11", by bearing on the one hand against the latter and on the other hand against the internal surface of the pedal body 2. Thus this modification resembles the modifications shown in FIGS. 14 to 17, because the only difference resides in the nature of the resilient return means.

So as further to facilitate the disconnection by disengagement of the engagement member fixed below the shoe when this member is in engagement between two arches, it is preferable to incline the pivotal axes P-P, P'-P' of the pivoting arches 9, 10 relative to the axis of rotation A-A of the pedal axle 3.

Figure 26:
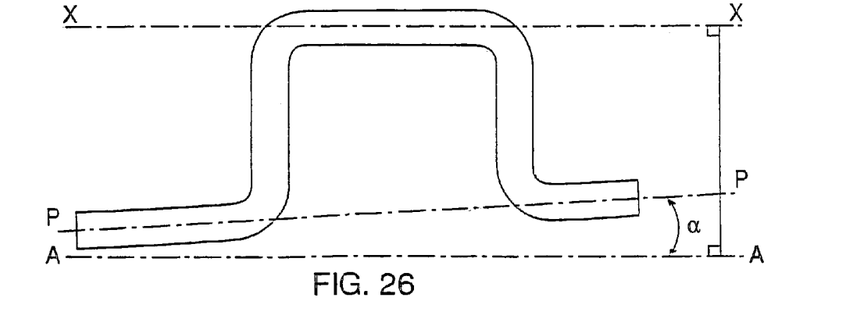
FIG. 26 is a fragmentary side view of a movable arch with an inclination of about 3° between the axis of rotation of the arch and the core of the arch.
Figure 27:
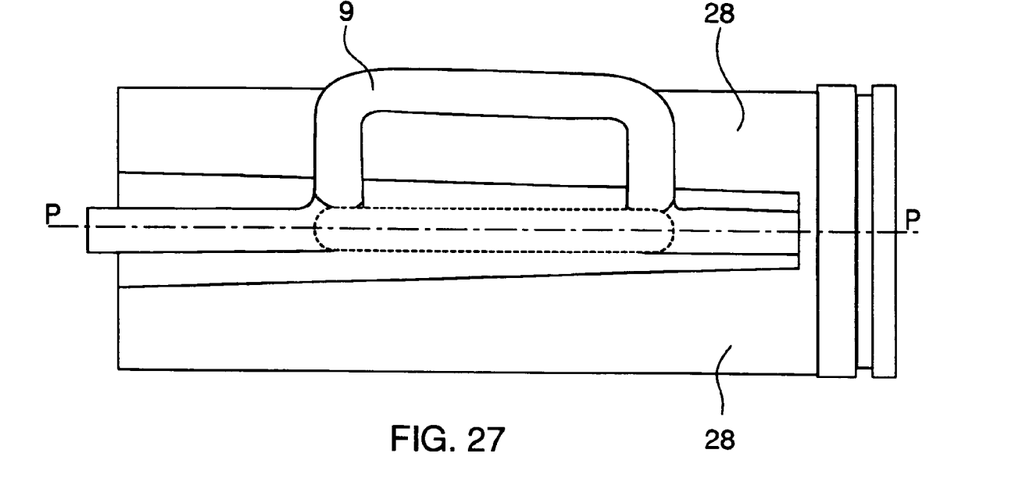
FIG. 27 is a fragmentary side view of the arch of FIG. 26, in its two end positions, showing the effect of the inclination of about 3° of FIG. 26.

More precisely, instead of being disposed parallel to the axis of rotation A-A of the pedal axle 3, these pivotal axes P-P, P'-P' are inclined at an angle a to the pedal axle in the direction of the external end of this latter, as is shown very schematically in FIG. 26. The part of the arch 9, 10 which is the farthest from the pivotal axis and which is symbolized by axis X-X in this figure, also remains parallel to the axis of rotation A-A of the pedal axle.

This has the consequence that the internal and external bearing surfaces of the ends of the arches 9, 10 defining the pivotal axes, are no longer located on identical radii, such that the distance separating the external portions of the arches 9, 10 increases more rapidly on the external end side of the pivotal axis P-P, P'-P' during active phases of engagement or disengagement of the engagement member, because of the differences in radii, and so as to create a privileged direction of releasing the engagement member outwardly of the pedal 1.

Generally speaking, with or without the relative inclination of the axes as has been described, there is obtained, thanks to the fact that the pivotal axes P-P, P'-P' of the pivoting arches 9, 10 will be eccentric relative to the axis of rotation A of the pedal axle 3, an amplitude of the relative angular displacement of the fixed and pivoting arches 7 to 10 that is less great, during the support and release of the engagement member; this corresponding value maintaining a value of the order of 15° to 20°, in each direction of pivoting of the pivotal arches, renders the disengagement and engagement operations substantially less difficult to carry out.

Figure 28:
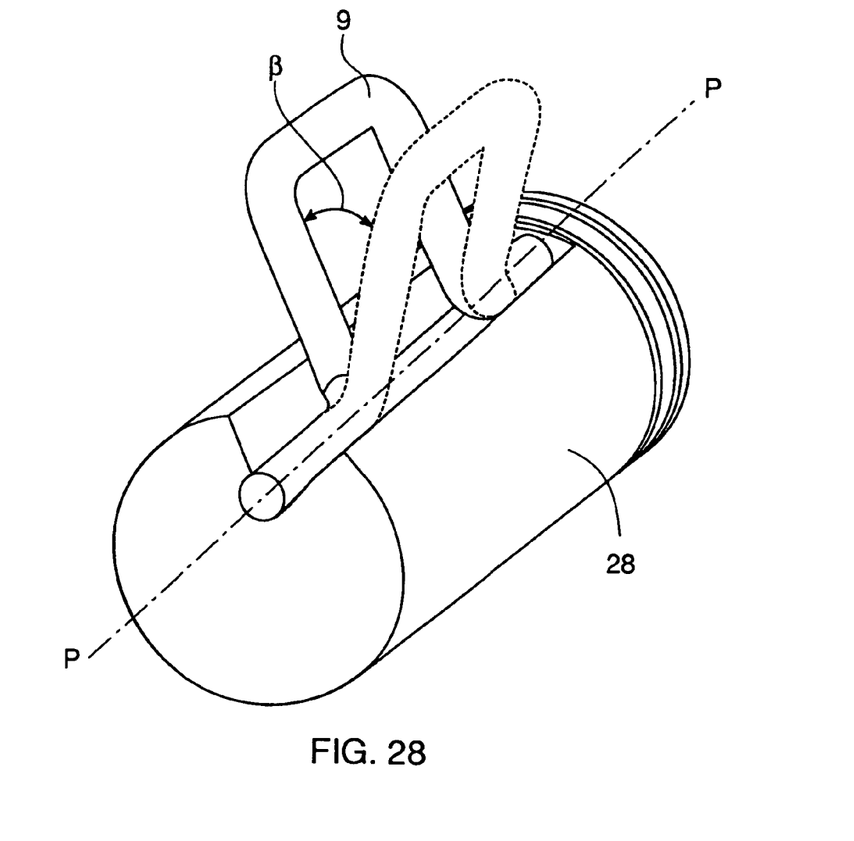
FIG. 28 is a fragmentary perspective view of FIG. 27, showing the angle β between the two end positions of a movable arch.

FIG. 28 shows schematically the angle β between the two end positions of the movable arch 9, 10 in the two directions of pivoting this latter, and which thus corresponds to twice the value indicated above, which is to say, a total angle of about 30 to 40°.

Of course, the invention is not limited to the examples that have been illustrated and described, but can without thereby departing from the spirit of the invention be applied to other modifications of an automatic pedal in which the pivotal axes of the pivoting arches are eccentric relative to the axis of rotation of the pedal axle.

The invention claimed is:

1. An automatic cycle pedal with multiple engagement surfaces, comprising:
   a pedal axle (3) adapted to be connected to a pedal crank;
   a pedal body (2) rotatably mounted on the pedal axle so as to be rotatable about a pedal axis, the pedal body comprising a pair of fixed arches (7, 8), each of the fixed arches being mounted fixedly on said pedal body (2) at both ends of said fixed arch, the fixed arches extending radially on opposite sides of said pedal body;
   a pair of pivoting arches (9, 10) disposed so that both ends of each of the pivoting arches are mounted pivotally on said pedal body (2), the pivoting arches being arranged opposite one another on the pedal body so that each of the pivoting arches lies between said fixed arches (7, 8);
   a return member arranged (12, 13; 32; 33; 37; 44) so as to urge either of the pivoting arches toward an initial position when either of the pivoting arches is pivotably displaced from that arch's initial position, so as to enable retaining an engagement member fixed to a bicycle shoe;

wherein each said pivoting arch (9, 10) is mounted on the pedal body so that displacement of the pivoting arch from the initial position is about a pivotal axis that is eccentric relative to the pedal axis (A-A);

wherein each pivoting arch (9, 10) carries an actuating member (11, 11'; 11") acting on said return member (12, 13; 32; 33; 37; 44) so as to permit relative angular spacing apart of a said pivoting arch (9, 10) relative to a said fixed arch (7, 8);

wherein said return member comprises a resilient split ring (12, 13) extending about said pedal axle (3) and bearing on said actuating member (11, 11') so as to coact directly with said actuating member;

wherein said actuating member has a shape of a first hollow cylindrical section (11) connected at one of the ends of each pivoting arch (9, 10) and extending axially within the arch and having on its external surface a bearing surface (15) against which rests said resilient ring (12).

2. The automatic pedal according to claim 1, wherein the pivoting arches (9, 10) are adapted to pivot independently of each other about separate pivotal axes (P-P, P'-P').

3. The automatic pedal according to claim 1, wherein said bearing surface (15) comprises an axial rib (18) received in the slot (17) of said ring (12) so as to limit the rotation of said ring.

4. The automatic pedal according to claim 1, wherein each said pivoting arch (9, 10) comprises at a second of its ends a second hollow cylindrical section (11') extending within the arch and having on its external surface a bearing surface (15') against which rests a second resilient split ring (13).

5. The automatic pedal according to claim 4, wherein the first and second cylindrical sections (11, 11') of each said pivoting arch (9, 10) rest on a respective tubular element (14) secured to the pedal body (2) and extending coaxially to the pedal axle (3) between the fixed arches (7, 8).

6. The automatic pedal according to claim 5, wherein said tubular elements (14) comprise on their external surfaces recesses (16) forming seats receiving said first and second cylindrical sections (11, 11').

7. The automatic pedal according to claim 6, wherein each end of said seats (16) defines one said pivotal axis (P-P, P'-P') for said cylindrical sections (16) permitting the corresponding pivoting arch (9, 10) to pivot in one direction or the other while acting on the resilient ring or rings (12, 13).

8. An automatic pedal with multiple engagement surfaces, comprising:

a pedal axle (3) adapted to be connected to a pedal crank;

a pedal body (2) rotatably mounted on the pedal axle so as to be rotatable about a pedal axis, the pedal body comprising a pair of fixed arches (7, 8), each of the fixed arches being mounted fixedly on said pedal body (2) at both ends of said fixed arch, the fixed arches extending radially on opposite sides of said pedal body;

a pair of pivoting arches (9, 10) disposed so that both ends of each of the pivoting arches are mounted pivotally on said pedal body (2), the pivoting arches being arranged opposite one another on the pedal body so that each of the pivoting arches lies between said fixed arches (7, 8);

a return member arranged (12, 13; 32; 33; 37; 44) so as to urge either of the pivoting arches toward an initial position when either of the pivoting arches is pivotably displaced from that arch's initial position, so as to enable retaining an engagement member fixed to a bicycle shoe;

wherein each said pivoting arch (9, 10) is mounted on the pedal body so that displacement of the pivoting arch from the initial position is about a pivotal axis that is eccentric relative to the pedal axis (A-A);

wherein the pivotal axes (P-P, P'-P') of the pivoting arches (9, 10) form with the axis of rotation (A-A) of the pedal axle (3) an angle (α) approaching the pedal axle (3) in a direction of an external end of the pedal axle, a portion of the arch (9, 10) which is farthest from the pivotal axis (P-P, P'-P') remaining parallel to the axis of rotation (A-A) of the pedal axle (3).

* * * * *